(12) United States Patent
Iyoda et al.

(10) Patent No.: US 12,722,590 B2
(45) Date of Patent: Sep. 1, 2026

(54) SEAT BACK

(71) Applicant: TOYOTA BOSHOKU KABUSHIKI KAISHA, Aichi-ken (JP)

(72) Inventors: Masahiko Iyoda, Nagakute (JP); Hiroshi Maki, Nissin (JP); Yuji Nakano, Nissin (JP); Takeshi Ushiyama, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 19/324,311

(22) Filed: Sep. 10, 2025

(65) Prior Publication Data

US 2026/0084643 A1 Mar. 26, 2026

(30) Foreign Application Priority Data

Sep. 20, 2024 (JP) ................................ 2024-163537

(51) Int. Cl.
*B60R 21/207* (2006.01)
*B60N 2/58* (2006.01)

(52) U.S. Cl.
CPC .......... *B60R 21/207* (2013.01); *B60N 2/5883* (2013.01)

(58) Field of Classification Search
CPC ........................... B60R 21/207; B60N 2/5883
USPC .......................................... 280/730.1, 730.2
See application file for complete search history.

(56) References Cited

U.S. PATENT DOCUMENTS

| | | | | |
|---|---|---|---|---|
| 5,893,579 | A * | 4/1999 | Kimura | B60N 2/5825 280/730.2 |
| 6,450,528 | B1 * | 9/2002 | Suezawa | B60R 21/207 280/730.2 |
| 7,380,812 | B2 * | 6/2008 | Tracht | B60R 21/207 280/730.2 |
| 7,540,529 | B2 * | 6/2009 | Tracht | B60N 2/6009 280/730.2 |
| 10,081,276 | B2 * | 9/2018 | Tanabe | B60R 21/201 |
| 2006/0113764 | A1 * | 6/2006 | Tracht | B60R 21/207 280/730.2 |
| 2006/0131848 | A1 * | 6/2006 | Miyake | B60R 21/207 280/730.2 |
| 2013/0187416 | A1 * | 7/2013 | Nakata | B60R 21/207 112/475.08 |

(Continued)

FOREIGN PATENT DOCUMENTS

JP 2020-33005 A 3/2020

*Primary Examiner* — Toan C To
(74) *Attorney, Agent, or Firm* — Greenblum & Bernstein, P.L.C.

(57) ABSTRACT

A seat back has a frame and a cushion member, which includes a main member at a center and a pair of side members. Each side member has a side pad, a side cover, and a side support member. An airbag device is installed inside one of the side member, which features a folded portion with U-shaped cross-section to accommodate the airbag. The support member has a deforming portion on its side. The seat back also has a first cover portion, a second cover portion, a front stay cloth, and a connecting stay cloth that are integrated by sewing at the first sewing portion. The second cover portion, the connecting stay cloth, and a rear stay cloth are connected to a resin plate at the second sewing portion. The first sewing portion is broken by the deployment pressure from the airbag.

7 Claims, 8 Drawing Sheets

(56) References Cited

U.S. PATENT DOCUMENTS

| | | | | |
|---|---|---|---|---|
| 2014/0225352 | A1* | 8/2014 | Awata | B60N 2/64<br>280/730.2 |
| 2015/0336528 | A1* | 11/2015 | Tanabe | B60N 2/5841<br>280/728.2 |
| 2016/0325646 | A1* | 11/2016 | Tanabe | B60N 2/42 |
| 2018/0222435 | A1* | 8/2018 | Fukawatase | B60R 21/23138 |
| 2019/0001914 | A1* | 1/2019 | Yaegashi | B60R 21/207 |
| 2020/0070699 | A1 | 3/2020 | Kakishima et al. | |
| 2021/0078518 | A1* | 3/2021 | Tanabe | B60R 21/23138 |

* cited by examiner

SEAT BACK

CROSS-REFERENCE TO RELATED APPLICATION

This application claims priority to Japanese patent application serial number 2024-163537 filed Sep. 20, 2024, the contents of which is incorporated herein by reference in its entirety for all purposes.

TECHNICAL FIELD

The present disclosure relates to a seat back. In particular, the present disclosure relates to a seat back with an airbag device installed inside.

BACKGROUND

There has been known a seat back for a vehicle seat that is mounted on a vehicle such as an automobile, in which a seat back pad covered with a seat back cover is divided into three parts in a seat width direction and assembled to a seat back frame. For example, a prior art discloses a seat back having a seat back main member that forms the central portion in the seat width direction and two seat back side members that are located on the side of the seat back main member. The seat back main member and the seat back side members are assembled to a seat back frame. Such a vehicle seat has good ease of assembly and is easily compatible with automation of assembly. In addition, it is easy to replace only the seat back side member, which tends to deteriorate when a seater gets on and off.

According to the vehicle seat described in the above prior art, the seat side back member has an insert wire and/or a plate for attachment to the seat back frame. Therefore, it is difficult to place an airbag device in the seat side back member because the airbag deployment may be obstructed by the insert wire or the seat back frame.

Therefore, there has been a need for a seat back in which a seat pad covered with a seat cover is divided into three parts in the seat width direction and assembled to a frame, and in which an airbag device can be attached without interfering with the deployment of the airbags.

SUMMARY

According to one aspect of the present disclosure, a seat back comprising a frame that forms a framework and a cushion member that is attached to the frame and elastically supports a seater. The cushion member comprises a main member at the center portion in a seat width direction and a pair of side members on both sides of the main member. The main member comprises a main pad, a main cover that covers the main pad, and a main support member that is attached to the frame side of the main pad and supports the main pad. The side member comprises a side pad, a side cover that covers the side pad, and a side support member that is attached to the frame side of the side pad and supports the side pad. At least one of the side members includes an airbag device. A folded portion having a substantially U-shaped cross section opening rearward is formed at the outer peripheral of the side support member of the side member in which the airbag device is located. The side member is formed by covering the side cover while being placed the side pad on the front side of the side support member in a state where the side pad covers the airbag device, covering the side cover from the front against the side pad, inserting a resin plate attached to the end of the side cover by sewing into the inside of the folded portion. The side cover member has a main portion covering the side pad and a secondary portion covering the side of the folded portion sewn together at a first sewing portion. One end of a first stay cloth, which is arranged at the front of the airbag device and is less stretchable than the side cover, is fixed to the frame. One end of a second stay cloth, which is arranged at the rear of the airbag device and is less stretchable than the side cover, is fixed to the frame. The other end of the first stay cloth and the other end of the second stay cloth are integrated with the main portion and the secondary portion by sewing at the first sewing portion. The second stay cloth has a main cloth extending from the one end to the second sewing portion and a secondary cloth extending from the other end to the second sewing portion. The main cloth, the secondary cloth, and the secondary portion are connected with a resin plate at the second sewing portion. The first sewing portion is torn by the deployment pressure when the airbag of the airbag device deploys.

Therefore, the side member can be formed by covering the side cover while being placed the side pad on the front side of the side support member, then insert the resin plate inside the deforming portion in the seat width direction. When the airbag deploys, the force applied via the front stay cloth causes the first sewing section to break, allowing the airbag to inflate forwardly from between the first cover portion and the second cover portion. In other words, the airbag device can be installed in a separate-type seat back which has the main member and two side members without reducing the functionality. In addition, the right end of the rear stay cloth is connected to the resin plate by the second sewing section, and the resin plate is inserted and fixed to the inside of the deforming portion. Therefore, when the left end of the rear stay cloth is fixed to the frame, no force is applied to the first sewing portion, and the first sewing portion is bent irregularly to prevent the appearance of the frame from deteriorating.

In accordance with another aspect of the present disclosure, a seat back comprising a frame that forms a framework and a cushion member that is attached to the frame and elastically supports a seater. The cushion member comprises a main member at the center portion in a seat width direction and a pair of side members on both sides of the main member. The main member comprises a main pad, a main cover that covers the main pad, and a main support member that is attached to the frame side of the main pad and supports the main pad. The side member comprises a side pad, a side cover that covers the side pad, and a side support member that is attached to the frame side of the side pad and supports the side pad. At least one of the side members includes an airbag device. A folded portion having a substantially U-shaped cross section opening rearward is formed at the outer peripheral of the side support member of the side member in which the airbag device is located. The side member is formed by covering the side cover while being placed the side pad on the front side of the side support member in a state where the side pad covers the airbag device, covering the side cover from the front against the side pad, inserting a resin plate attached to the end of the side cover by sewing into the inside of the folded portion. The side cover comprises a main portion that covers the side pad and a secondary portion that covers the side of the folded portion, wherein the main portion and the secondary portion are sewn at a first sewing portion that extends along the front end of the folded portion. One end of a first stay cloth, which is arranged at the front of the airbag device and is less stretchable than the side cover, is fixed to the frame. One end of a second stay cloth, which is arranged at the rear of the airbag device and is less stretchable than the side cover, is fixed to the frame. The other end of the first stay cloth and the other end of the second stay cloth are integrated with the main portion and the secondary portion by sewing at the first sewing portion. The second stay cloth is arranged so as to abut the corner portion of the folded portion. The first sewing portion is torn by the deployment pressure when the airbag of the airbag device deploys.

Therefore, the side member can be formed by covering the side cover while being placed the side pad on the front side of the side support member, then insert the resin plate inside the deforming portion. When the airbag is deployed, the force applied via the front stay cloth and the rear stay cloth causes the first sewing section to break. Therefore, the airbag can inflate forwardly from between the first cover portion and the second cover portion. In other words, the airbag device can be integrated into the separate-type seat back which has the main member and two side members without compromising the seat's functionality or appearance. In addition, the rear stay cloth is arranged so as to abut the front inner corner of the deforming portion. When one end of the rear stay cloth is fixed to the frame, the load is received by the frictional force at the front inner corner. Therefore, force is not easily applied to the first sewn portion. Thus, it is possible to suppress irregular bending of the first sewing section, which deteriorates the appearance.

DETAILED DESCRIPTION

Referring to FIGS. 1 to 6, a seat back 3 of an automobile seat 1 in accordance with an embodiment of the present disclosure will be described. In the following description, explanations regarding the directions shall be based on the respective directions of up/down, front/rear, right/left as shown in each figure. Here, the up/down, front/rear, right/left directions are defined based on the automobile seat 1 when it is mounted on a floor F of the automobile. The right-left direction corresponds to a seat width direction.

Figure 1:
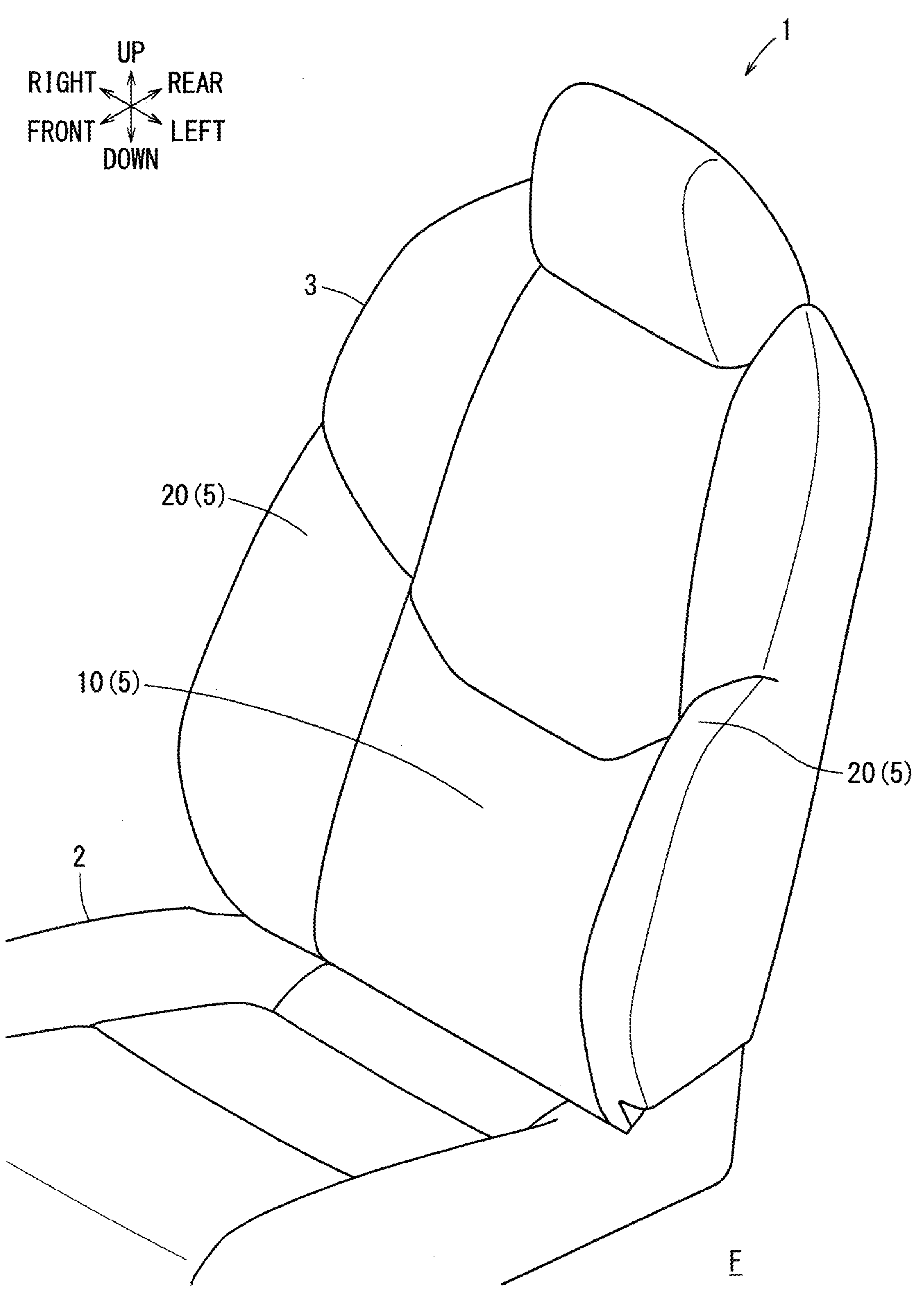
FIG. 1 is a perspective view of an automobile seat to which a seat back according to one embodiment is assembled.

As shown in FIG. 1, the automobile seat 1 has a seat cushion 2 that supports the buttocks and thighs of a seater and a seat back 3 that supports the waist and back of the seater.

Figure 2:
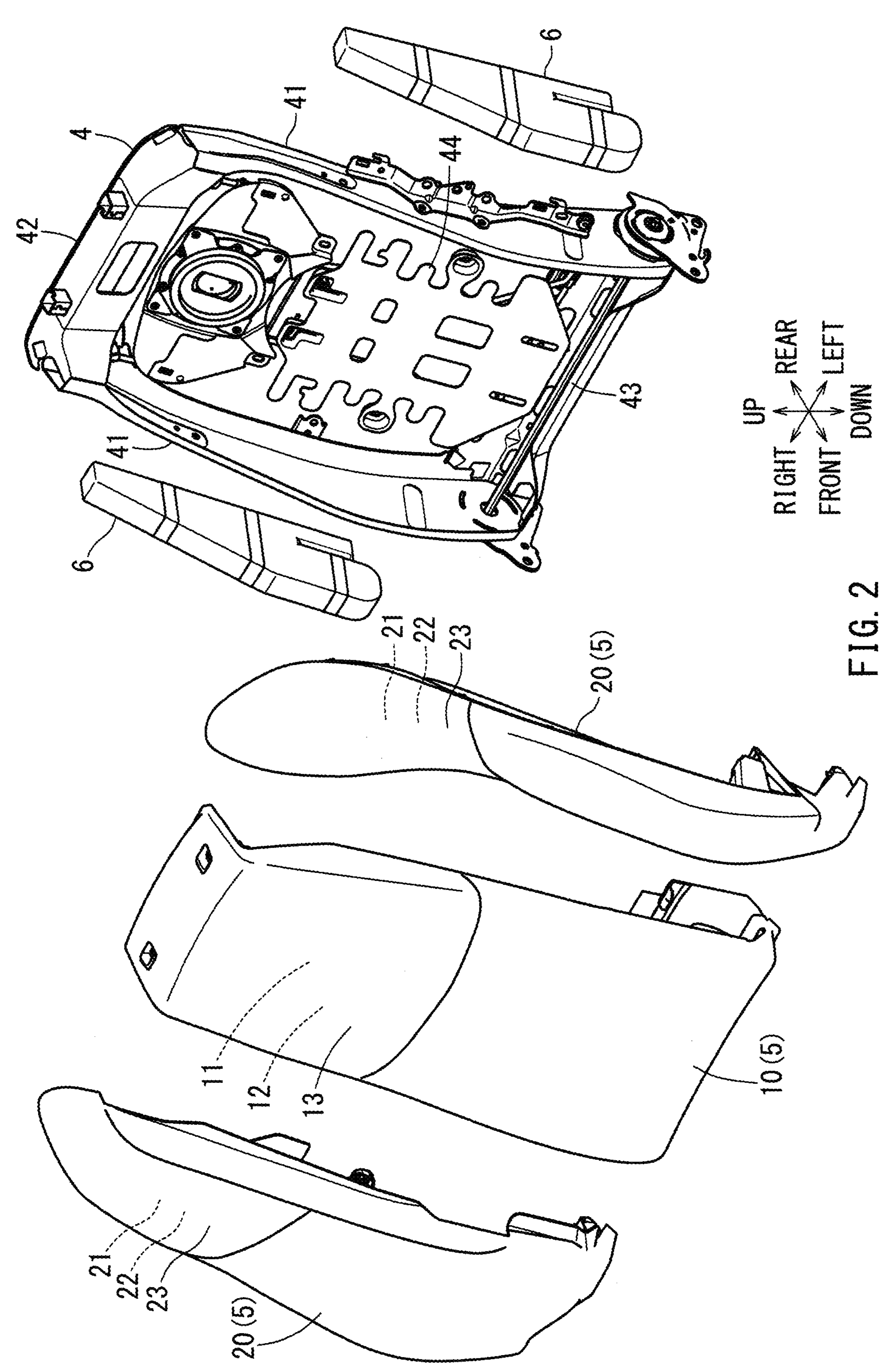
FIG. 2 is an exploded perspective view of the seat back of FIG. 1.

As shown in FIGS. 1 and 2, the seat back 3 has a frame 4, a cushion member 5, and a right-left pair of airbag devices 6. The frame 4 forms a framework of the seat back 3. The cushion member 5, which is assembled to the frame 4, has a cushioning function and defines the external shape of the seat back 3.

As shown in FIGS. 1 and 2, the frame 4 has a pair of side frames 41, an upper frame 42, and a lower frame 43. The side frames 41 extend vertically along the right and left sides of the seat back 3. The upper frame 42 is bridged across the upper ends of the side frames 41. The lower frame 43 is bridged across the lower ends of the side frames 41. The frame 4 is formed in the shape of a rectangular viewed from the front. A lumbar plate 44 is arranged between the upper frame 42 and the lower frame 43.

As shown in FIGS. 1 to 5, the cushion member 5 has a main member 10 at the central portion in the seat width direction and a right-left pair of side members 20 on both sides of the main member 10. The main member 10 located in the central portion of the seat back, it supports the waist and back of the seater from the rear side. The side member 20 supports the waist and back of the seater from the side.

The main member 10 has a main support member 11, a main pad 12, and a main cover 13. The main support member 11 is made of, for example, resin. The main pad 12 is a cushioning body disposed on the front side of the main support member 11 and supported by the main support member 11 against the frame 4. The main cover 13 covers the main pad 12 from the front side.

The rear surface of the upper part of the main support member 11 is fixed to the upper frame 42. The rear surface of the main support member 11 is fixed to the lumbar plate at approximately the center in a vertical direction. The rear surface of the lower part of the main support member 11 is fixed to the lower frame 43.

The main pad 12 is typically made of an elastic body, often a foam molded body of polyurethane resin, which offers both cushioning and durability. The main pad 12 has approximately the same external shape as the main support member 11 when viewed from the front. The main cover 13 is formed by sewing multiple pieces. The main cover 13 is a bag-shaped that opens rearwardly. The main cover 13 covers the main pad 12, which is arranged on the front side of the main support member 11, from the front side. The end portion of the opening of the main cover 13 is then engaged with the outer peripheral part of the main support member 11, thereby the main member 10 is formed.

As shown in FIGS. 2 to 5, the side member 20 has a side support member 21, a side pad 22, and a side cover 23. The side support member 21 is made of, for example, resin. It supports the side pad 22 against the frame 4 and includes a through hole and a deforming portion with a substantially U-shaped cross section opening rearwardly. The side pad 22 is a cushioning body disposed on the front side of the side support member 21. The side pad 22 is supported by the side support member 21 against the frame 4. The side cover 23 covers the side pad 22 from the front side.

Figure 3:
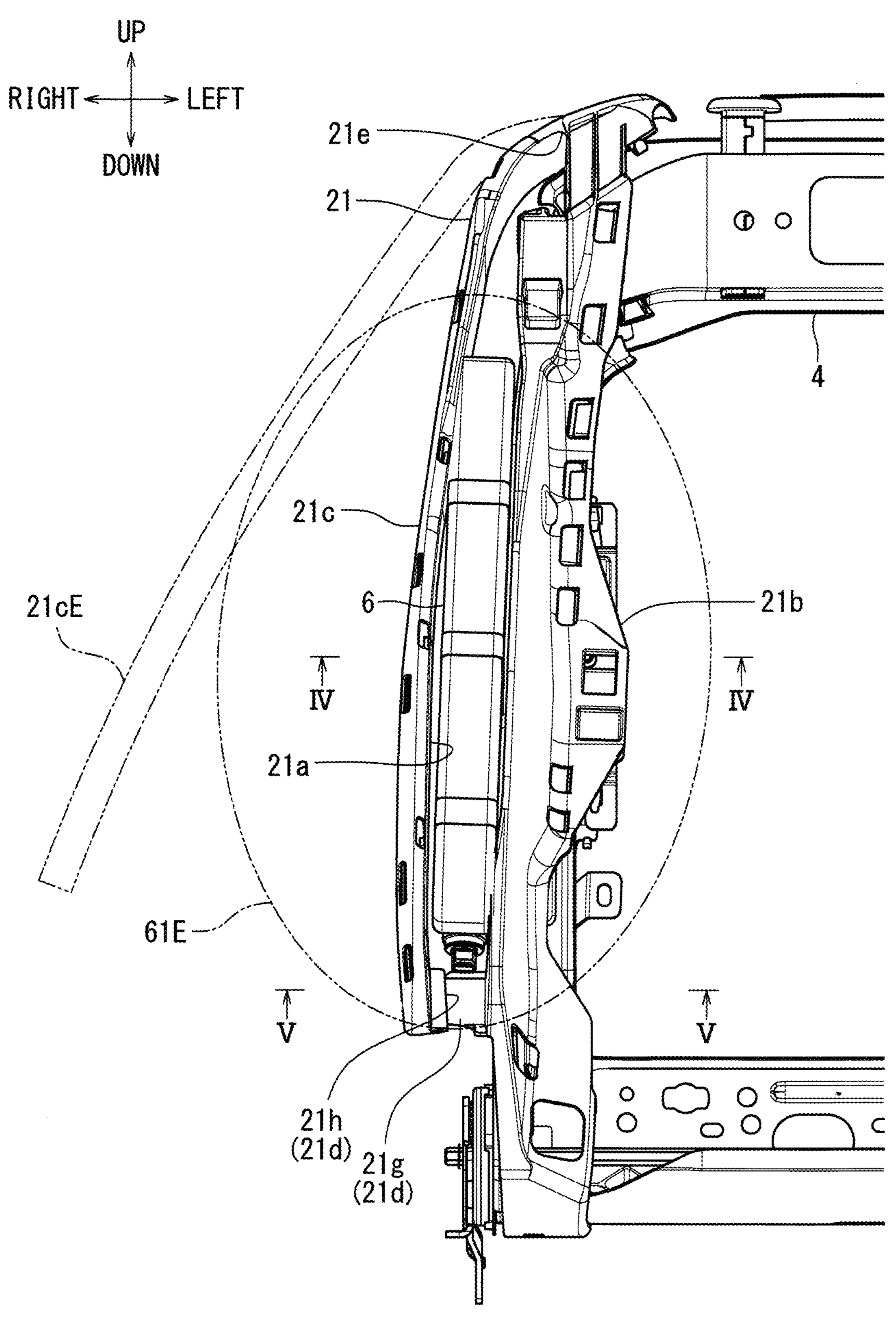
FIG. 3 is a front view of the seat back of FIG. 1, wherein only a right side is shown since the shape of the seat back is symmetrical to the right and left. Only a frame and a side support member of a side member are shown.

As shown in FIG. 3, the side support member 21 extends vertically. A through hole **21*a* is formed in the center area in a right-left direction of the side support member 21. The through hole 21*a* extends in the vertical direction and penetrates in a front-rear direction. The left side of the through hole 21*a* (inside the seat) is a base portion 21*b* extending vertically along the front side of the side frame 41. The right side of the through hole 21*a* (outside the seat) is a deforming portion 21*c*. The shape of the horizontal cross section of the deforming portion 21*c* is substantially U-shape opening rearwardly. (see FIGS. 4 and 5). A weakened portion 21***d* is formed at the lower part of the through hole 21*a*. The lower end of the base portion 21*b* and the lower end of the deforming portion 21*c* are connected via the weakened portion 21*d*. The upper end of the base portion 21*b* and the upper end of the deforming portion 21*c* are connected so that the upper end of the deforming portion 21*c* gradually curves to the left (inwardly toward the seat) as it moves upward against the upper end of the base portion 21*b*. On the upper part of the through hole 21*a*, an R-portion 21*e*, which has an R-shape viewed from the front, is formed between the base portion 21*b* and the deforming portion 21*c*. The rear surface (not shown) of the abbreviated center portion in the vertical direction of the base portion 21*b* and the weakened portion 21*d* are fixed to the frame 4. Here, the deforming portion 21*c* corresponds to the "folded portion" of the claims.

Figure 5:
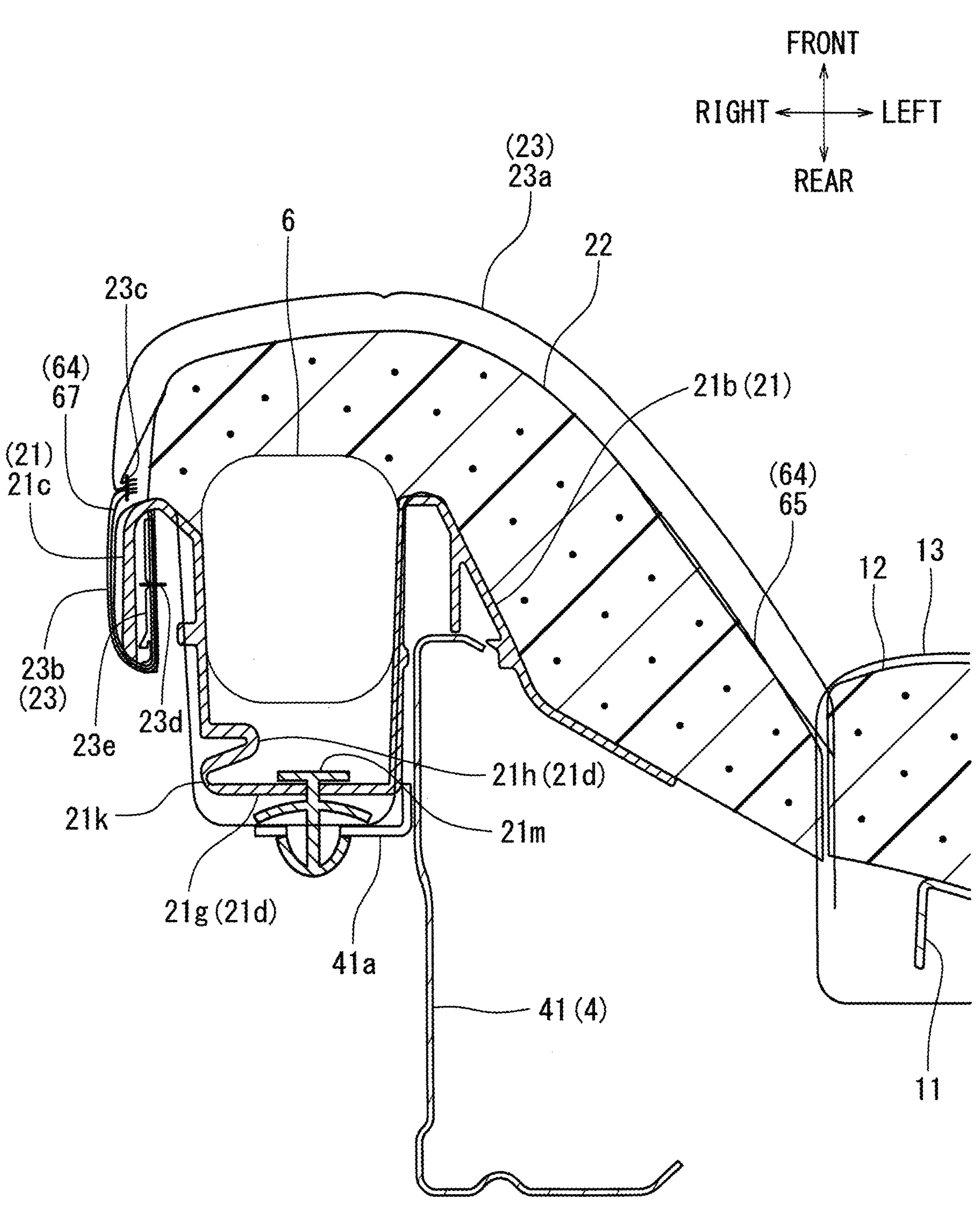
FIG. 5 is a cross-sectional view taken along a line V-V in FIG. 3, wherein the back pad and the back cover of the side member, and the main member are shown.

As shown in FIGS. 3 and 5, the weakened portion 21*d* has an attaching portion 21*g*, which has a rectangular-shape viewed from the front, and a bending portion 21*h*, which has a Z-shaped cross-section cut in the horizontal plane. The front end of the bending portion 21*h* is connected to the deforming portion 21*c*. The rear end of the bending portion 21*h* is connected to the right end of the attaching portion 21*g*. An outer bending portion 21*k*, which is the bending area on the right side (outside of the seat) of the bending portion 21*h*, has a thinner wall thickness. Therefore, when a load toward the right direction (outside direction of the seat) is applied to the deforming portion 21*c* due to airbag deployment, the weakened portion 21*d* is easily ruptured. The attaching portion 21*g* is fixed to a bracket 41*a* of the side frame 41 by a clip 21*m* that is passed through the clip hole (not shown).

Figure 4:
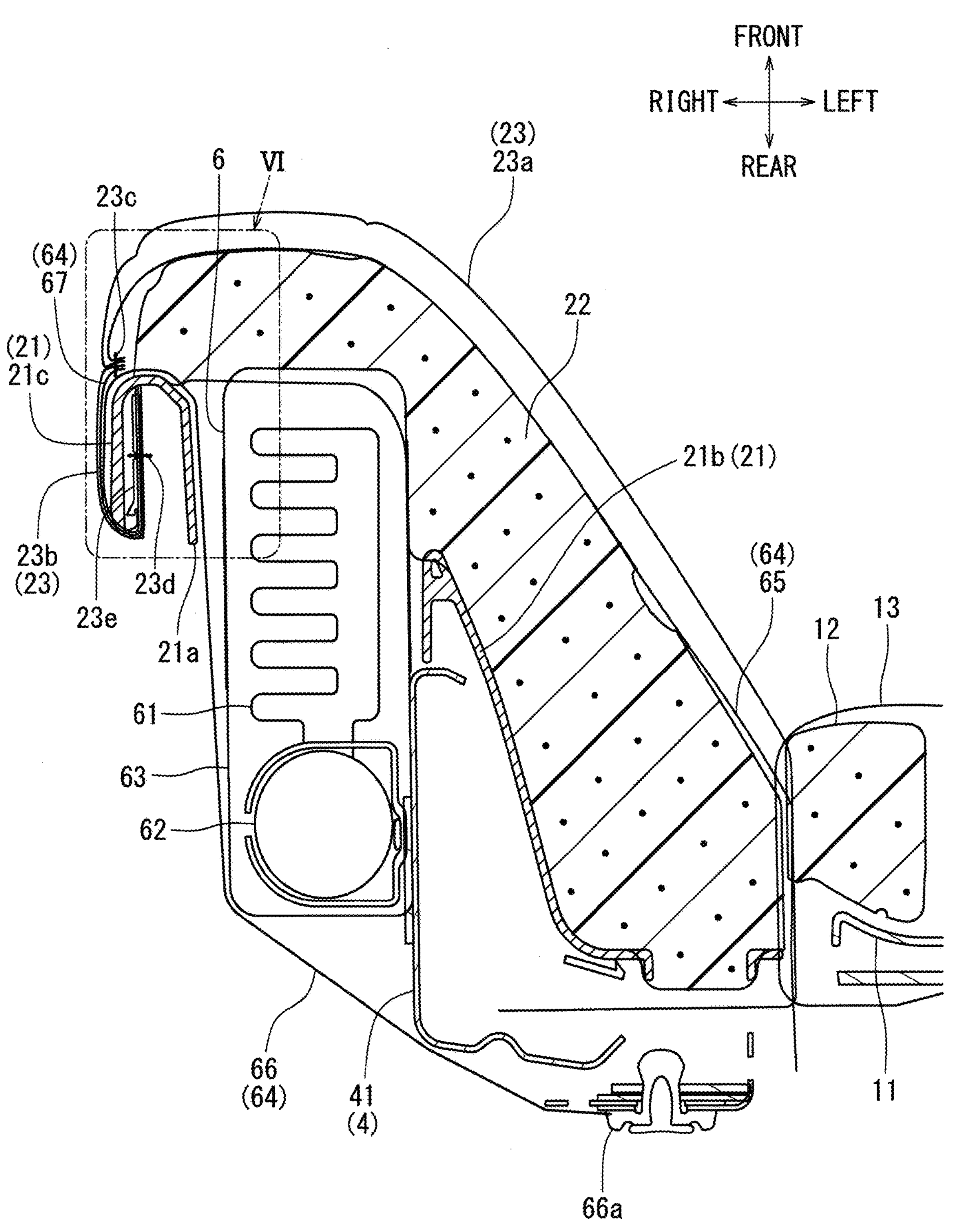
FIG. 4 is a cross-sectional view taken along a line IV-IV in FIG. 3, wherein a back pad and a back cover of the side member, and a main member are shown.
Figure 6:
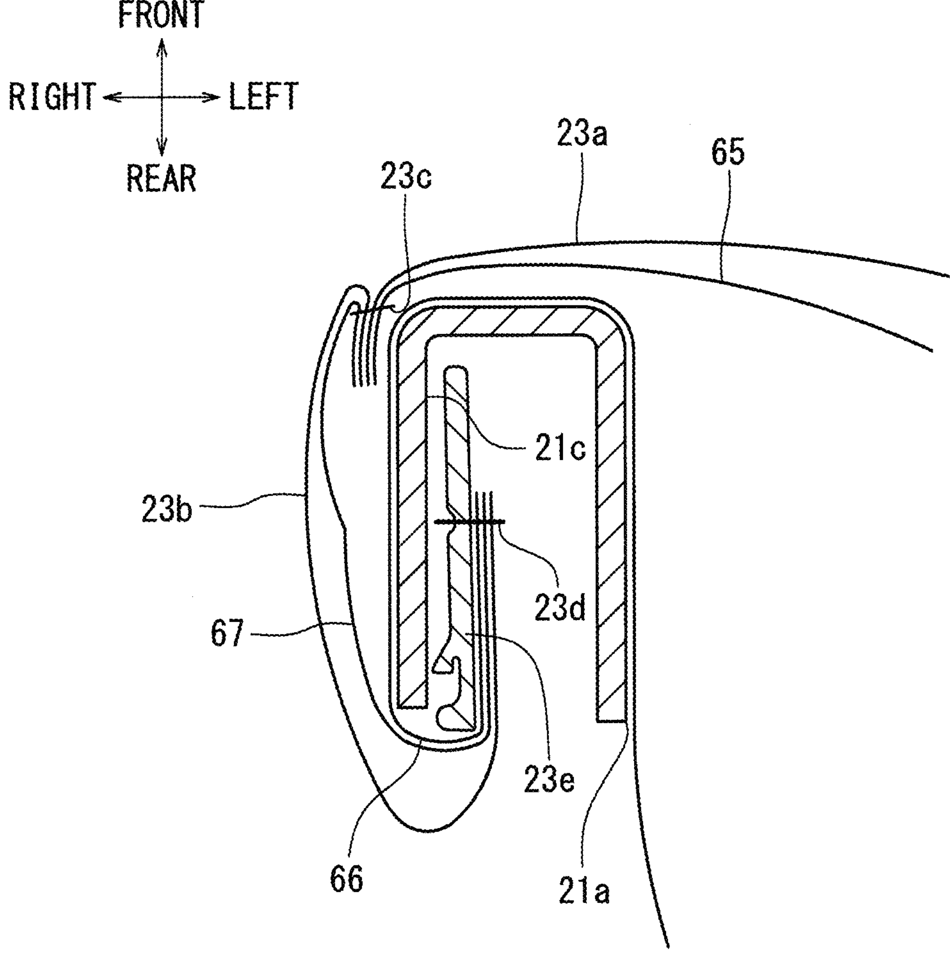
FIG. 6 is an enlarged schematic diagram of a part VI in FIG. 4.

As shown in FIGS. 2, 4 and 5, the side pad 22 has approximately the same external shape as the side support member 21 when viewed from the front. The side pad 22 is an elastic cushion body made of a foam molded body of polyurethane resin, disposed on the front side of the side support member. The side pad 22 is formed to cover the front surface of the airbag device 6. The side pad 22 does not have a through hole penetrated in the front-rear direction, which corresponds to the through hole 21*a*. The side cover 23 is a bag-shaped formed by sewing multiple pieces, which covers the side pad 22 from the front side of the side support 21. The opening end of the side cover 23 is then fastened to the outer peripheral part of the side support member 21, thereby the side member 20 is formed. As shown in FIGS. 4 and 6, the side cover 23 has a first cover portion 23*a*, which covers the front and left sides of the side pad 22, and a second cover portion 23*b*, which covers the right side of the side support member 21. The right end of the first cover portion 23*a* and the right front end of the second cover portion 23*b* are connected by a first sewing portion 23*c*. The left front end of the second cover portion 23*b* and the left front end of a connecting stay cloth 67 (described later) are both connected to a resin plate 23*e* by a second sewing portion 23*d*. Here, the first cover portion 23*a* corresponds to the "main portion" of the claims. The second cover part 23*b* corresponds to the "secondary portion" of the claims.

The airbag device 6 is assembled to the outer surface of the right and left side frames 41. Since the right and left airbag devices 6 have abbreviated symmetrical shape, the airbag device 6 on the right side will be described. As shown in FIGS. 2 to 5, the airbag device 6 is formed in a vertically long box shape. The external shape of the airbag device 6 roughly matches the shape of the through hole 21*a* of the side support member 21 when viewed from the front. The airbag device 6 has an airbag 61, an inflator 62, a case 63, and a stay cloth 64 (front stay cloth, rear stay cloth, and connecting stay cloth). Upon receiving a collision signal from the vehicle's ECU (not shown) the inflator 62 injects gas into the airbag 61. Thereby, the airbag 61 inflates to the front of the seat upon activation.

The case 63 is a vertical box-shaped container that houses the airbag 61 and the inflator 62 inside. The left side surface of the case 63 is fixed to the side frame 41. When the airbag 61 inflates, the case 63 is opened through a slit (not shown). Then, the airbag 61 deploys to the front of the seat.

As shown in FIGS. 4 and 6, the seat back 3 has the stay cloth 64. The stay cloth 64 is a stretch-resistant guide cloth that guide the deployment direction of the airbag 61 and ensure that the first sewing portion breaks properly to allow the airbag 61 to emerge. The stay cloth 64 comprises a front stay cloth 65 arranged on the front side, a rear stay cloth 66 arranged on the rear side, and a connecting stay cloth 67 arranged between the front stay cloth 65 and the rear stay cloth 66. The right end of the front stay cloth 65, the right end of the first cover portion 23*a*, the right front end of the second cover portion 23*b*, and the right front end of the connecting stay cloth 67 are overlapped in this order and sewn together at the first sewing portion 23*c*. Here, the right end of the front stay cloth 65 corresponds to the "other end" of the claims. The right front end of the connecting stay cloth 67 corresponds to the "other end portion" of the claims. The right end of the rear stay cloth 66, the left front end of the connecting stay cloth 67, and the left front end of the second cover portion 23*b* are overlapped in this order and sewn with the resin plate 23*e* by the second sewing portion 23*d*. The resin plate 23*e* is arranged on the inner side of the U-shaped deforming portion 21*c* of the side support member 21. Thereby, the right side of the side cover 23 is fixed to the side support member 21. The left end of the front stay cloth 65 is fixed to the frame 4 by a fixing member (not shown). The left end of the rear stay cloth 66 is fixed to the frame 4 by a fixing member 66*a*. Here, the front stay cloth 65 corresponds to the "first stay cloth" of the claims. The combination of the rear stay cloth 66 and the connecting stay cloth 67 corresponds to the "second stay cloth" of the claims. The rear stay cloth 66 corresponds to the "main cloth" of the claims. The connecting stay cloth 67 corresponds to the "secondary cloth" of the claims.

The assembly procedure of the seat back 3 will be described. First, as shown in FIGS. 3 to 5, the airbag device 6 is assembled to the outer side of each side frame 41. Then, the pre-assembled right and left side members 20 are assembled to the frame 4. At this time, the airbag device 6 is arranged inside the side member 20 by passing the airbag device 6 through the through hole 21*a* of the side support member 21. Then, the left end of the front stay cloth 65 is fixed to the frame 4 by a fixing member (not shown). The rear stay cloth 66 is placed in contact with the front surface of the deforming portion 21*c*. Then, the left end (corresponds to "one end portion" of the claims) of the rear stay cloth 66 is fixed to the frame 4 by the fixing member 66*a*. Next, the main member 10 is assembled to the frame 4. Here, the left end of the front stay cloth 65 corresponds to "one end" of the claims. The left end of the rear stay cloth 66 corresponds to "one end portion" of the claims. Finally, a backboard (not shown) is attached to the rear side of the frame 4 to conceal inside. When removing the main member 10 and each side member 20 from the frame 4, the procedure is the reverse of the above procedure.

As shown in FIG. 1, the seat back 3, which is assembled as described above, is attached to the seat cushion 2 to form the automobile seat 1. The automobile seat 1 is then fixed to the floor F. In this state, when the airbag device 61 receives the signal of the vehicle collision from the ECU, the inflator 62 injects gas into the airbag 61. The airbag 61 is then inflates to the front of the seat upon activation. At this time, as shown in FIG. 3, the outer bending portion 21*k* (see FIG. 5) of the weakened portion 21*d* is ruptured in the process of the airbag 61 expanding to a deployed state 61E. As a result, the deforming portion 21*c* of the side support member 21 turns around its upper end toward the right direction to become the deformed state 21*c*E. At the same time, the first sewing portion 23*c* is ruptured by the tensile force applied by the front stay cloth 65, the rear stay cloth 66, and the connecting stay cloth 67 in the process of the airbag 61 unfolding to become the deformed state 61E. The airbag 61 is deployed from between the first cover portion 23*a* and the second cover portion 23*b* toward the front of the seat back 3. Since the rear stay cloth 66 and the connecting stay cloth 67 are connected at the second sewing portion 23*d*, even if the resin plate 23*e* comes off from the inner of the U-shaped deforming portion 21*c*, a tensile force is reliably applied to the first sewing portion 23*c*. Thereby the first sewing section 23*c* will be ruptured.

The embodiment configured as described above has the following effects. The side member 20 can be formed by covering the side cover 23 while being placed the side pad 22 on the front side of the side support member 21, then insert the resin plate 23*e* inside the deforming portion 21*c*. When the airbag 61 is deployed, the force applied via the front stay cloth 65, the rear stay cloth 66, and connecting stay cloth 67 causes the first sewing section 23*c* to break. Therefore, the airbag 61 can inflate forwardly from between the first cover portion 23*a* and the second cover portion 23*b*. In other words, the airbag device 6 can be installed in a separated-type seat back 3 which has the main member 10 and two side members 20 without reducing the functionality. In addition, the right end of the rear stay cloth 66 is connected to the resin plate 23*e* at the second sewing section 23*d*, and the resin plate 23*e* is inserted and fixed to the inside of the deforming portion 21*c*. Therefore, when the left end of the rear stay cloth 66 is fixed to the frame 4, no force is applied to the first sewing portion 23*c*, and the first sewing portion 23*c* is bent irregularly to prevent the appearance of the frame 4 from deteriorating.

Figure 7:
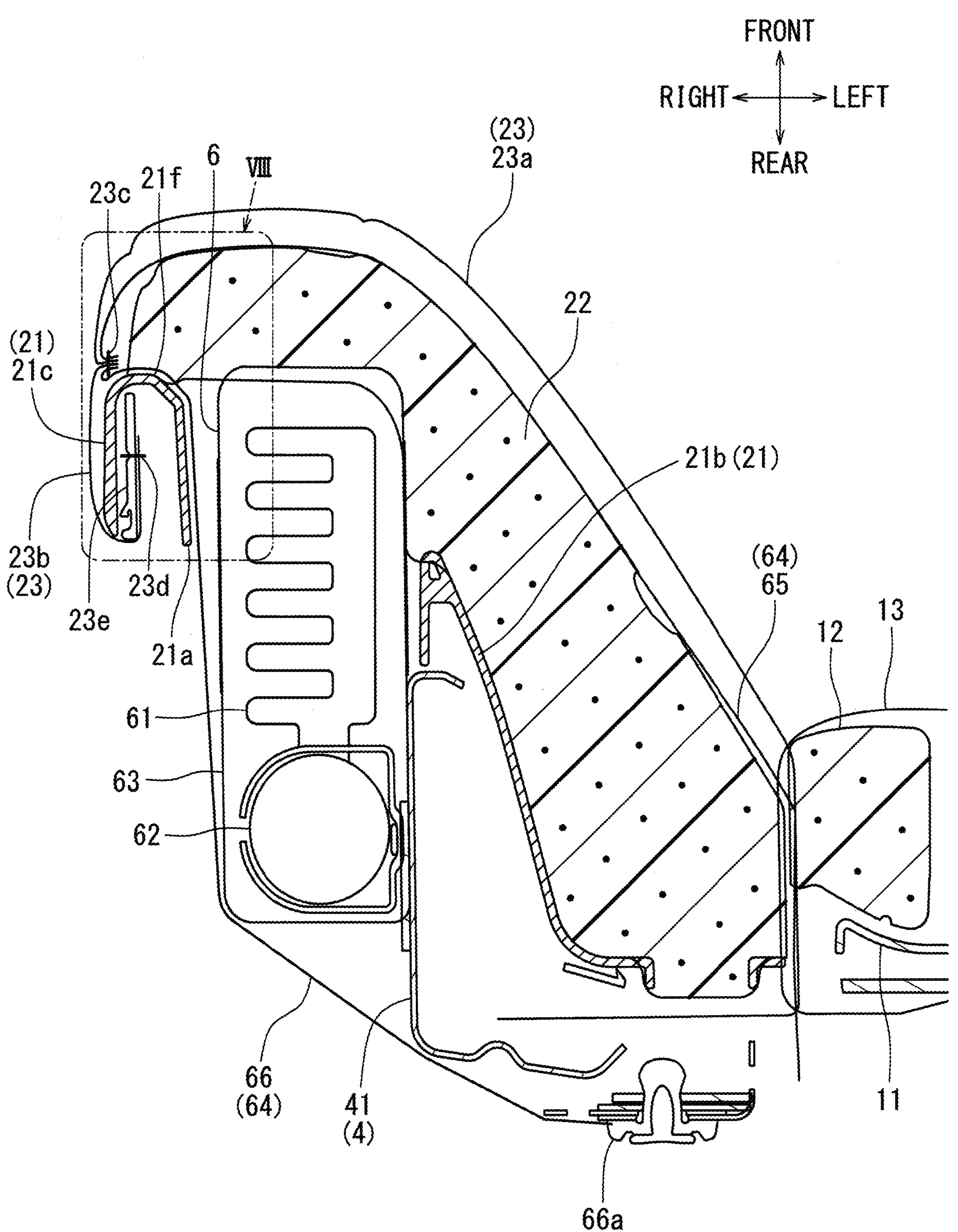
FIG. 7 is a cross-sectional view corresponding to FIG. 4 of another embodiment.
Figure 8:
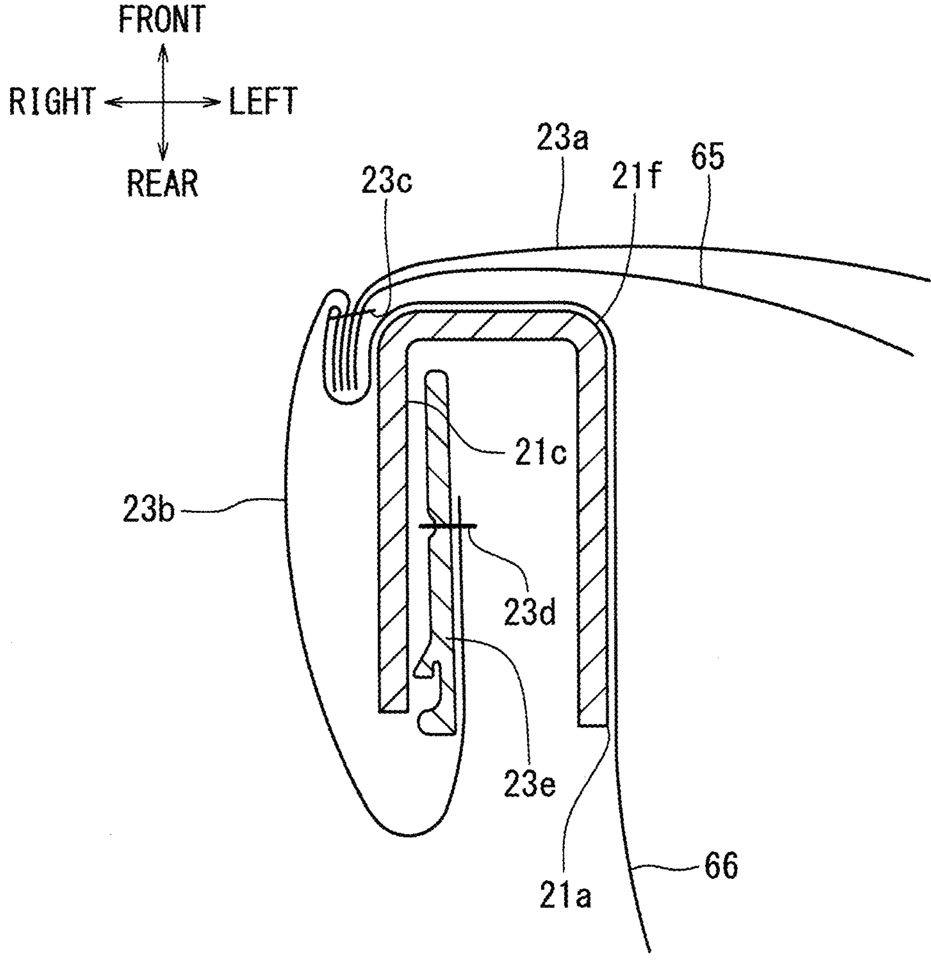
FIG. 8 is an enlarged schematic diagram of a part VIII in FIG. 7.

Referring to FIGS. 7 and 8, another embodiment of the present disclosure will be described. The other embodiment differs from the above embodiment in at least two points. One is that the seat back 3 does not have the connecting stay cloth 67, and the front stay cloth 65 and the rear stay cloth 66 are directly connected to each other. The other is that the rear stay cloth 66 abuts against a front inner corner 21*f* of the deforming portion 21*c*. The same components as those in the above embodiment are denoted by the same reference numbers and the description thereof will be omitted. The right end of the front stay cloth 65, the right end of the first cover portion 23*a*, the right front end of the second cover portion 23*b*, and the right end of the rear stay cloth 66 are overlapped in this order and sewn at the first sewing portion 23*c*. The left front end of the second cover portion 23*b* is connected to the resin plate 23*e* by the second sewing portion 23*d*. The resin plate 23*e* is placed on the inner of the U-shaped deforming portion 21*c* of the side support member 21. Thereby, the right side of the side cover 23 is fixed to the side support member 21. Here, the right end of the front stay cloth 65 corresponds to the “other end” of the claims. The right end of the rear stay cloth 66 corresponds to the “other end portion” of the claims. The left end of the front stay cloth 65 is fixed to the frame 4 by a fixing member (not shown). The left end of the rear stay cloth 66 is fixed to the frame 4 by the fixing member 66*a*. Here, the front stay cloth 65 corresponds to the “first stay cloth” of the claims. The rear stay cloth 66 corresponds to the “second stay cloth” of the claims.

The assembly procedure of the seat back 3 is the same as that of the above-described embodiment. During the airbag 61 deploys to the deployed state 61E, the first sewing portion 23*c* is broken by the tensile force applied by the front stay cloth 65 and the rear stay cloth 66. Then, the airbag 61 is deployed to the front of the seat back 3 from between the first cover portion 23*a* and the second cover portion 23*b*.

The embodiments configured as described above have the following effects. The side member 20 can be formed by covering the side cover 23 while being placed the side pad 22 on the front side of the side support member 21, then insert the resin plate 23*e* inside the deforming portion 21*c* in the seat width direction. When the airbag 61 is deployed, the force applied via the front stay cloth 65 and the rear stay cloth 66 causes the first sewing section 23*c* to break. Therefore, the airbag 61 can inflate forwardly from between the first cover portion 23*a* and the second cover portion 23*b*. In other words, the airbag device 6 can be installed in a separated-type seat back 3 which has the main member 10 and two side members 20 without reducing the functionality. In addition, the rear stay cloth 66 is arranged so as to abut the front inner corner 21*f* of the deforming portion 21*c*. When one end of the rear stay cloth 66 is fixed to the frame 4, the load is received by the frictional force at the front inner corner 21*f*. Therefore, force is not easily applied to the first sewn portion 23*c*. This arrangement helps to suppress irregular bending of the first sewing section 23*c*, thereby maintaining the appearance and functionality of the seat back. Here, the front inner corner 21*f* corresponds to the “corner portion” of the claims.

Although certain embodiments have been described above, the present disclosure is not limited to their appearance and configuration, and various changes, additions, and deletions are possible to the extent that they do not alter the gist of the invention. For example, the following are examples.

According to the above embodiments, the airbag devices 6 are arranged on both the right and left sides. However, the seat back may be configured so that the airbag device 6 is arranged on only one of the right and left sides.

According to the above embodiments, the present disclosure is applied to the seat back 3 of the automobile seat 1, but may also be applied to a seat of a railway vehicle.

The various examples described above in detail with reference to the attached drawings are intended to be representative of the present disclosure and are thus non-limiting embodiments. The detailed description is intended to teach a person of skill in the art to make, use and/or practice various aspects of the present teachings, and thus does not limit the scope of the disclosure in any manner. Furthermore, each of the additional features and teachings disclosed above may be applied and/or used separately or with other features and teachings in any combination thereof, to provide an improved seat back, and/or methods of making and using the same.

What is claimed is:

1. A seat back comprising:

a frame that forms a framework; and a cushion member attached to the frame and configured to elastically support a seater, wherein the cushion member further comprises a main member located at a center portion in a seat width direction, the main member comprises a main pad, a main cover enclosing the main pad, and a main support member attached to the frame side of the main pad for supporting the main pad, and a pair of side members located on both sides of the main member, each of the pair of side members comprises a side pad, a side cover enclosing the side pad, and a side support member attached to a frame side of the side pad and configured to support the side pad, wherein at least one of the side members includes an airbag device, wherein a folded portion is formed at the side support member of the side member in which the airbag device is located, wherein the side cover further comprises a main portion enclosing the side pad and a secondary portion enclosing a side of the folded portion, wherein the main portion and the secondary portion are sewn at a first sewing portion extending along front end of the folded portion, wherein one end of a first stay cloth, which is less stretchable than the side cover, arranged at a front of the airbag device is fixed to the frame, wherein one end portion of a second stay cloth-, which is less stretchable than the side cover, arranged at a rear of the airbag device is fixed to the frame, wherein the other end of the first stay cloth and the other end portion of the second stay cloth are integrated with the main portion and the secondary portion by sewing at the first sewing portion, wherein the second stay cloth has a main cloth extending from the one end to a second sewing portion and a secondary cloth extending from the other end to the second sewing portion, wherein the main cloth, the secondary cloth, and the secondary portion are connected with a resin plate at the second sewing portion and wherein the first sewing portion is torn by deployment pressure from the airbag device.

2. The seat back of claim 1, wherein the folded portion has a substantially U-shaped cross section opening rearwardly at an outer peripheral of the side support member.

3. The seat back of claim 1, wherein each of the pair of side members is formed by placing the side pad on a front side of the side support member, covering with each of the pair of side members with the side cover, and inserting a resin plate attached to the side cover into a folded portion of the side support member.

4. A seat back comprising:

a frame that forms a framework; and a cushion member that is attached to the frame and elastically supports a seater, wherein the cushion member comprises a main member located at a center portion in a seat width direction, the main member comprises a main pad, a main cover enclosing the main pad, and a main support member attached to the frame side of the main pad for supporting the main pad, and a pair of side members located on both sides of the main member, each of the pair of side members comprises a side pad, a side cover enclosing the side pad, and a side support member attached to a frame side of the side pad and configured to support the side pad, wherein at least one of the side members includes an airbag device, wherein a folded portion having a substantially U-shaped cross section opening rearwardly is formed at the side support member of the side member in which the airbag device is located, wherein each of the pair of side members is formed by placing the side pad on a front side of the side support member, covering with each of the pair of side members with the side cover, and inserting a resin plate attached to the side cover into a folded portion of the side support member, wherein the side cover further comprises a main portion enclosing the side pad and a secondary portion enclosing a side of the folded portion, wherein the main portion and the secondary portion are sewn at a first sewing portion extending along front end of the folded portion, wherein one end of a first stay cloth arranged at a front of the airbag device is fixed to the frame, wherein one end portion of a second stay cloth arranged at a rear of the airbag device is fixed to the frame, wherein the other end of the first stay cloth and the other end portion of the second stay cloth are integrated with the main portion and the secondary portion by sewing at the first sewing portion, wherein the second stay cloth is arranged to abut on a corner portion of the folded portion, and wherein the first sewing portion is torn by deployment pressure from the airbag device.

5. The seat back of claim 4, wherein the first stay cloth is less stretchable than the side cover and fixed to the frame.

6. The seat back of claim 4, wherein the second stay cloth is less stretchable than the side cover and fixed to the frame.

7. The seat back of claim 4, wherein the stay cloth further comprises a connecting stay cloth arranged between the first stay cloth and the second stay cloth.

* * * * *